May 14, 1963　　　S. ELCHYSHYN　　　3,089,950
FLOATING-TYPE CHILL BLOCK

Filed June 23, 1961　　　　　　　　　　　　3 Sheets-Sheet 1

*INVENTOR.*
STEPHEN ELCHYSHYN
BY
Gerald A. Koris
ATTORNEY

May 14, 1963 S. ELCHYSHYN 3,089,950
FLOATING-TYPE CHILL BLOCK

Filed June 23, 1961 3 Sheets-Sheet 3

INVENTOR.
STEPHEN ELCHYSHYN
BY
*Gerald A. Faris*
ATTORNEY

United States Patent Office 3,089,950
Patented May 14, 1963

3,089,950
FLOATING-TYPE CHILL BLOCK
Stephen Elchyshyn, Woodland Hills, Calif., assignor to North American Aviation, Inc.
Filed June 23, 1961, Ser. No. 119,198
9 Claims. (Cl. 219—160)

This invention relates to an improved chill block, and more particularly pertains to a chill block adapted to conduct heat from rounded members in a welding operation.

Arc welding is commonly used for joining metals such as aluminum and its alloys, magnesium and its alloys, copper, stainless steel and other ferrous and nonferrous alloys. It is particularly useful in sealing the ends of thin-walled tubes with solid plugs. In this application, a high integrity and helium leak-tight weld is generally mandatory. Also, it is desirable that the weld bead be small and nearly flush with the tube surface. This can only be achieved by uniformly cooling the heat-affected zone to protect the thin gauge tubing from the intense heat of the welding arc. Such cooling is generally accomplished by means of a chill block fastened contiguously to the periphery of the tube directly below the joint, to provide a path for the conduction of excess heat from the welding zone.

The conventional split-type, copper chill block assembly comprises a bisected circular disc having a centrally located hole adapted to receive a metal tube and fastening means for mounting the semi-circular portions of the disc around the surface of the tube. Such devices have a number of drawbacks. For example, continuous contact between the sides of the disc hole and the tube periphery is rarely obtained. This is due to the fixed size of the disc hole and the diameter tolerance of commercial tubing which prevents a tight fit when the tube size is either on the low or high side of nominal. Without continuous contact, the heat-affected zone bordering the joint is insufficiently cooled and an unreliable, low quality weld is produced. The discolored heat band which normally occurs below a welded joint is affirmative evidence of the inadequate cooling effect of a conventional chill block. The heat band is very narrow at points of good contact but becomes much wider in the area of no contact.

There are numerous adverse effects resulting from inadequate cooling in the heat-affected zone. The usual mechanical effects of welding, such as distortion and residual stresses, are aggravated. High residual stresses may reduce the strength of the welded joint or even cause cracking during welding. Nonuniform cooling may also cause weld porosity and a large, irregular weld bead. In addition, metallurgical transformations in the metal may be of such magnitude as to change its properties. For example, over-heating causes excessive grain growth which produces brittleness. In type 304 stainless steel, excessive grain growth produces the phenomenon of "intergranular attack." The carbon in steel combines with the chromium to form chromium carbide which migrates to the grain boundaries, severely decreasing the strength of the steel and rendering it susceptible to corrosion. The ultimate result of inadequate cooling in the heat-affected zone is, therefore, a low quality weld, unacceptable for most industrial applications.

Accordingly, an object of this invention is to provide an improved chill block.

Another object of this invention is to provide a floating-type chill block wherein continuous contact and uniform pressure between a workpiece and the block is maintained irrespective of changes in the diameter or configuration of the workpiece.

Another object is to provide a chill block which accommodates members having various diameters.

Another object is to provide a chill block having means for automatically adjusting its position in response to variations in the diameter or configuration of the workpiece, thereby avoiding loss of contact.

A further object is to provide a chill block which conducts heat from the heat-affected area with such effectivness that a high integrity, helium-leak-tight weld is produced.

A still further object is to provide apparatus for arc welding rounded members.

These and other objects and advantages of the present invention will be more apparent from the following detailed description and drawings, hereby made a part hereof, in which.

Figure 1:
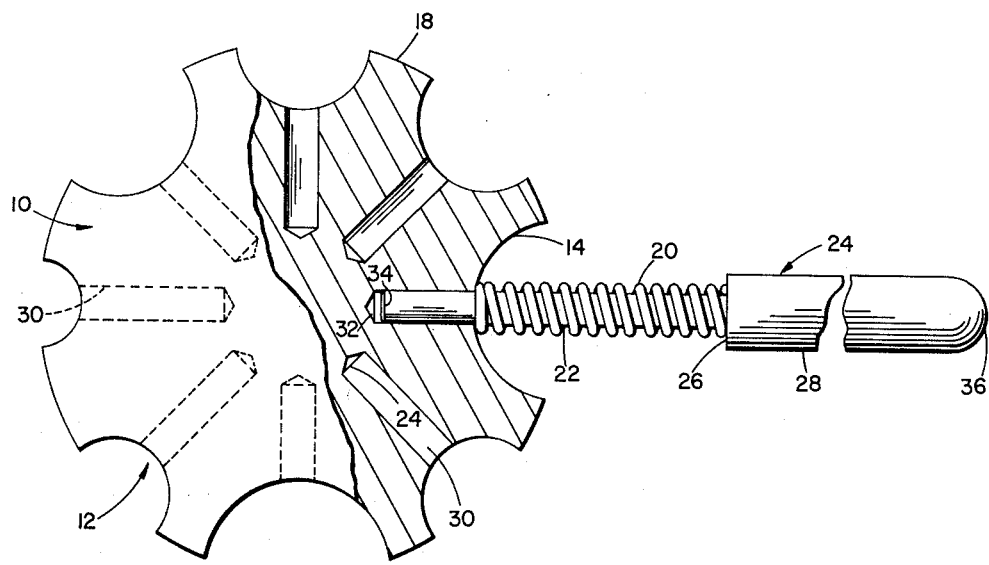
FIG. 1 is a partially sectioned plan view of the present invention.

The preferred embodiment of my chill block will be described in connection with arc welding end plugs in thin-walled tubing. In FIG. 1, chill block 10 is disc-shaped and composed of a metal having a high thermal conductivity, such as copper. It includes a plurality of semi-circular recesses 12 defined by surfaces 14 which receive and partially encircle a tube 16 (FIG. 4) being welded. Contact with tube 16 is made along surfaces 14. The recesses 12 are equally spaced around the peripheral surface 18 of chill block 10 and each recess has a different radius of curvature so that various size tubing can be accommodated by the chill block. The radii of curvature of the recesses are determined on the basis of providing more than 90° but less than 180° arc of contact between surface 14 of recess 12 and the surface of tube 16. This is accomplished by making the recess radius slightly larger than the tube radius.

Two important objectives of my invention are accomplished by such curvature radii. First, continuous contact between tube 16 and chill block 10 can be maintained if the arc of contact is less than 180°, notwithstanding variations in tube diameter due to the commercial tolerance factor or changes in tube configuration as a result of distortion during welding. Also, although only partial contact is made between tube 16 and chill block 10, effective cooling is still obtained when the arc of contact covers at least 90° of the tube surface.

Figure 2:
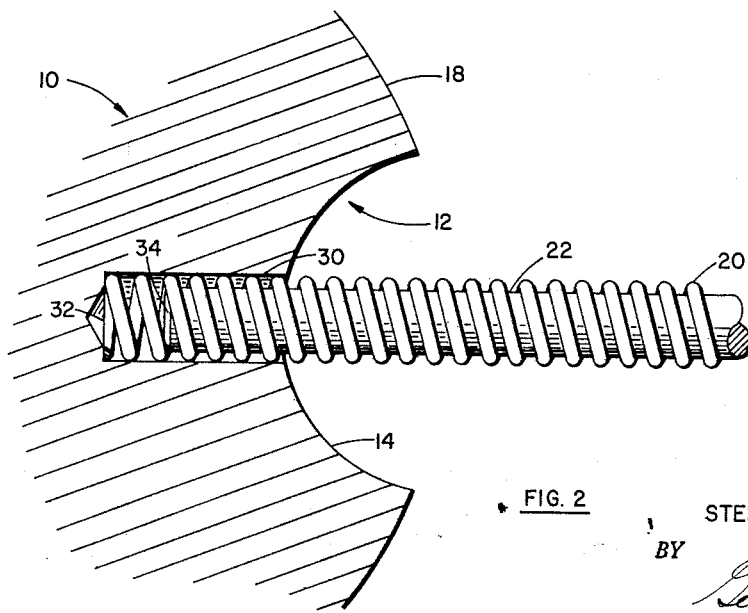
FIG. 2 is a fragmentary plan view in section of an alternate arrangement of a portion of the embodiment of FIG. 1.
Figure 3:
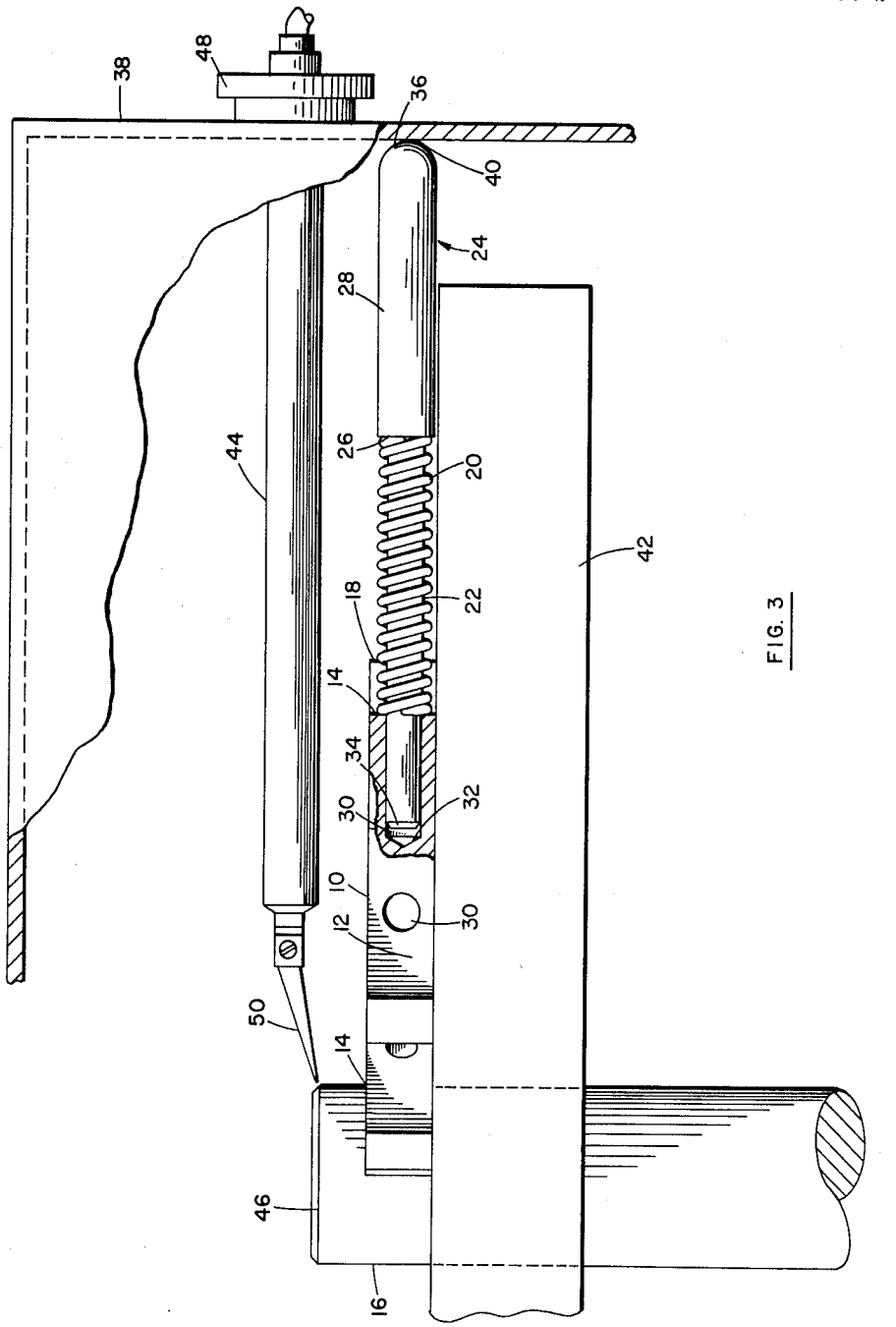
FIG. 3 is partially sectioned elevational view of the chill block in assembled relationship with its associated components during a welding operation.
Figure 4:
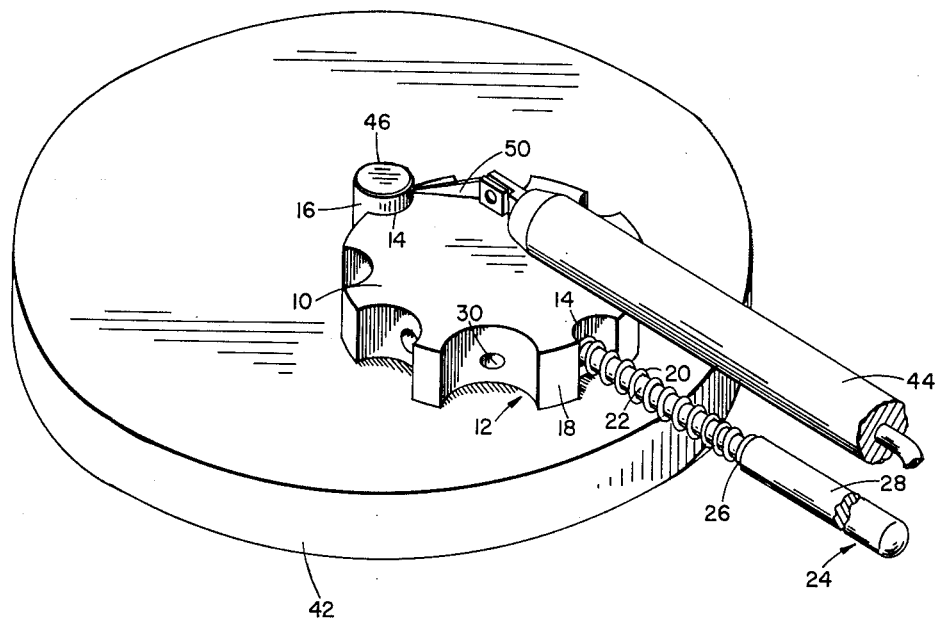
FIG. 4 is a perspective view showing the chill block in the same relationship as in FIG. 3.

The manner in which contact between the chill block and the tube is maintained during welding will now be described. Turning to FIGS. 3 and 4, a spring 20 mounted on the shank 22 of handle 24 exerts a lateral pressure which holds chill block 10 in firm contact against tube 16 during the welding operation. Spring 20 is compressed between surface 14 of chill block 10 and a shoulder 26, defined by shank 22 and body 28 of handle 24. Each recess 12 has a radially directed blind hole 30 into which shank 22 is inserted in loose-fitting relationship. Alternatively, the diameter of hole 30 could be made large enough to accommodate both shank 22 and spring 20, as shown in FIG. 2. In the FIG. 2 arrangement, the spring would abut against the bottom 32 of hole 30. Handle 24 is placed in the blind hole located diametrically from the recess containing the tube being welded. In this manner, the lateral force exerted by spring 20 is applied normally to the surface of tube 16. The shank end 34 of handle 24 is spaced from the bottom 32 of hole 30 to permit free lateral movement of chill block 10 against spring 20. Thus, the chill block has a "floating" action which ensures continued contact and uniform pressure between the tube and block. This "floating" action avoids loss of contact if the tube diameter is on the low side of its nominal size or in the event of tube distortion. Also, if tube 16 expands from the welding heat, block 10 is free to move laterally in the direction of the expansion and thereby maintain approximately uniform pressure against tube 16. In its operative position, the body end 36 of handle 24 abuts against the welding chamber 38 at 40 for support. If a welding chamber is not being used, a bracket or other suitable means could be employed to provide support for handle 24.

Preliminary to welding, tube 16 is located in an appropriate recess 12 and handle 24 is inserted in a hole 30 diametrically opposite the tube with its body end 36 contacting welding chamber 38 at 40. In this position, spring 20 is compressed between a recess surface 14 in chill block 10 and shoulder 26 on handle 24. The lateral force exerted by the spring maintains the chill block in contact with tube 16 and supports handle 24 in the horizontal position shown.

As seen in FIGS. 3 and 4, during a welding operation, tube 16 is fixed to the turntable 42 by a clamp (not shown), and a conventional drive unit (not shown) rotates the turntable and tube together. The electrode 44 is positioned in proximity to the joint 46, and the chill block is held directly beneath the electrode in sliding contact with the tube. Current is supplied through the electrode holder 48 to the electrode 44, thereby producing an electric arc between tube 16 and electrode tip 50. The intense heat of the arc unites the metals by fusion. Heat is drawn away from the workpiece by conduction through block 10, and thence transferred by radiation to the environment; mechanical cooling of the block is not ordinarily required.

It can be seen that the floating feature of my chill block together with its recesses for receiving tubes to be welded overcome the disadvantages of the conventional chill block mentioned above. By maintaining continuous contact and uniform pressure between the chill block and tube, the zone of the tube directly below electrode tip 50 is more effectively cooled. This minimizes tube distortion with its resulting residual stresses and produces a high quality weld having superior strength and metallurgical structure.

It is to be understood that the above-described preferred embodiment is only by way of illustration and not for purposes of limitation. The scope of the invention is understood to be limited only as set forth in the following claims.

What is claimed is:

1. Chill block means for conducting heat from a member subjected to a heat source, comprising a movable, unitary block having at least one surface defining a recess therein for receiving said member, said recess being adapted to contact from about 90° to about 180° of the surface of said member, and means for urging said block against said member, thereby maintaining contact between said recess and said member.

2. A chill block adapted to conduct heat from a work member exposed to a heat source, comprising a movable, unitary block having a plurality of surfaces defining recesses therein, each of said recesses having a different radius of curvature for accommodating work members having various radii, the radius of curvature of each recess being larger than its related work member to provide an area of contact between said block and said member from about 90° to about 180° of the surface of said member, and means for urging said block against said worker member, thereby maintaining contact between said recess and said work member.

3. A chill block adapted to conduct heat from a rounded workpiece subjected to a heat source, comprising a movable, unitary block having a circumferential surface defining at least one concave recess therein for contacting said workpiece, said recess circumscribing from about 90° to about 180° of the surface of said workpiece, and means for urging said block against said workpiece, thereby maintaining said recess in contact with said member, said means being located on an opposite side of said block to said workpiece.

4. A chill block comprising a block having a circumferential surface defining a plurality of equally spaced, semicircular recesses of different radii for receiving workpieces exposed to a heat source, said recesses adapted to contact from about 90° to about 180° of the surface of said workpiece; and means for maintaining said block in contact with said workpiece, said means being located on an opposite side of said block to said workpiece, and including spring means for maintaining said block against said workpiece.

5. A heat conducting chill block composed of a high thermal conductivity material which cools the heat-affected zone of a rounded workpiece being welded, comprising a block having a circumferential surface, said surface defining a plurality of equally spaced recessed surfaces adapted to circumscribe and contact from about 90° to 180° of the surface of a rounded workpiece, said recessed surfaces having different radii of curvature whereby said block is adaptable to workpieces of various diameters; and spring loading means for maintaining contact between said workpiece and said block comprising a handle engageable in said block, said handle having a shoulder portion and a spring mounted on said handle, said spring being compressed between said shoulder and said block and urging said block against said workpiece.

6. The chill block of claim 5, wherein said recessed surfaces of said block define internal radial bores adapted to receive said handle.

7. The chill block of claim 5, wherein said handle is operatively positioned in a bore opposite the recess containing said workpiece, whereby the force exerted by said spring is applied normally to said workpiece.

8. A chill block for conducting heat from the heat-affected zone during the welding of rounded workpieces, comprising a block having a plurality of semi-circular recessed surfaces which receive said workpieces and wherein said chill block contacts from about 90° to about 180° of the surface of said workpiece, said recesses having different radii of curvature whereby said chill block is adaptable to rounded workpieces of various diameters, each of said recesses containing a bore extending radially inward in said block, means for spring-loading said block against said member comprising a handle positioned in, and spaced from the end of, a bore opposite the recess containing said workpiece, and handle having a shank portion and a body portion defining a shoulder therebetween, a spring mounted on said shank between its associated recess and said shoulder, whereby the spring action provided maintains contact between said block and workpiece.

9. Arc welding apparatus adapted to fusion weld rounded members, said apparatus comprising an electrode, means for electrically energizing said electrode, means for supportably rotating said members, a chill block comprising a block having a circumferential surface defining a plurality of semicircular recessed surfaces which receive said member and wherein said chill block slidingly contacts from about 90° to about 180° of the surface of said member adjacent said heat-affected zone, said recessed surfaces having different radii of curvature whereby said chill block is adaptable to rounded members of various diameters, and means for maintaining contact between said member and said block, whereby said chill block is repositionable in response to changes in the configuration of said member and continuous contact is thereby maintained.

References Cited in the file of this patent

UNITED STATES PATENTS

| | | |
|---|---|---|
| 989,497 | Frick | Apr. 11, 1911 |
| 1,001,049 | Knipe | Aug. 22, 1911 |
| 2,077,653 | Westin | Apr. 20, 1937 |